United States Patent
Inamura et al.

[15] 3,640,509
[45] Feb. 8, 1972

[54] APPARATUS FOR CONTINUOUS REACTION OF HIGH VISCOUS MATERIALS

[72] Inventors: Seiichi Inamura; Yusuke Kondo; Minoru Akita; Kenichi Chikanari, all of Ootsu, Japan

[73] Assignee: Toyo Boseki Kabushiki Kaisha, Osaka, Japan

[22] Filed: Apr. 3, 1969

[21] Appl. No.: 813,209

[30] Foreign Application Priority Data

Apr. 6, 1968  Japan..................................43/23021

[52] U.S. Cl................................................259/104, 259/6
[51] Int. Cl. ..........................................................B01f 7/08
[58] Field of Search....................259/64, 104, 179, 6, 21, 41, 259/DIG. 12, DIG. 13, DIG. 10, DIG. 11, 97, 178 R; 241/98; 416/176

[56] References Cited

UNITED STATES PATENTS

| | | |
|---|---|---|
| 1,370,764 | 3/1921 | Popkess..........................259/178 R |
| 2,506,101 | 5/1950 | Oltz..................................416/176 X |
| 2,570,864 | 10/1951 | Rowlson..........................259/DIG. 13 |
| 3,064,908 | 11/1962 | Hjelte..............................259/104 X |
| 3,125,968 | 3/1964 | Baker..............................259/DIG. 12 |

FOREIGN PATENTS OR APPLICATIONS

| | | |
|---|---|---|
| 645,765 | 9/1962 | Italy..................................259/178 R |
| 569,381 | 7/1958 | Belgium..............................259/179 |

Primary Examiner—Walter A. Scheel
Assistant Examiner—Alan I. Cantor
Attorney—Wenderoth, Lind & Ponack

[57] ABSTRACT

An apparatus for continuously treating a high-viscosity material. A vessel has two spiral agitating blades arranged substantially horizontally and in side-by-side relation therein. Neither has a central supporting shaft, and each has a plurality of scraping blades projecting outwardly close to the inside surface of the wall of the vessel. The agitating blades intermesh with each other when the blades are rotated in opposite directions for scraping substantially all of the viscous material on the adjacent side and bottom wall of the vessel off such wall.

6 Claims, 5 Drawing Figures

SEIICHI INAMURA,
YUSUKE KONDO,
MINORU AKITA AND
KENICHI CHIKANARI,

*Inventors*

APPARATUS FOR CONTINUOUS REACTION OF HIGH-VISCOUS MATERIALS

This invention relates to an apparatus for the continuous treatment (e.g., polymerization or concentration) of high-viscous material. More particularly, this invention relates to an apparatus for the continuous treatment of high-viscous material wherein efficient agitation and high surface area renewal or generation are accomplished.

In an apparatus for treating high-viscous material, for example, in an apparatus for conducting the final stage of polymerization or polycondensation in the production of a film or film-forming polyester where the reaction mass is highly viscous liquid material, the material must be well agitated so that local overheating and degradation are prevented and the surface of the reaction mass is constantly renewed to facilitate the removal of volatile byproducts of the polymerization. Further, in order to obtain constant or uniform residence time of the reaction mass in the vessel there should be no such place where the reaction material stays as deposited or adhered.

In order to meet with these requirements, various reaction apparatus have been suggested. However, each of them has various disadvantages and there has been no fully satisfactory one.

Therefore an object of this invention is to provide an apparatus for the continuous treatment of high-viscous material wherein the viscous material is continuously and effectively agitated.

Another object of this invention is to provide an apparatus of the type described above wherein the surface of the reaction mass is constantly renewed in order to facilitate the escape of volatile byproducts.

Still another object of this invention is to provide an apparatus of the type mentioned above wherein the residence time is kept substantially constant or uniform throughout the reaction mass.

Other objects, features and advantages of this invention will be apparent from the following description.

Briefly, this invention provides an apparatus comprising a vessel with mechanical agitating means which comprises at least two sets of an agitator in the form of a central-shaftless screw or spiral-shaped agitating blade arranged substantially horizontally and having a plurality of scraper plates projecting outwardly therefrom to be close to the inner wall of at least a lower half of the vessel, the agitators being so substantially horizontally arranged that, when rotated in opposite directions, they intermesh with each other and substantially all of the reaction mass on or adjacent the side and bottom inner wall of the vessel is scrapped by the scraper plates.

It has been usual or conventional that an agitator of this kind has a central supporting shaft which is driven. It has been found that viscous material will deposit on and/or remain staying (stagnate) around the central shaft so that no uniform residence time of the reaction material in the reaction vessel can be attained. Thus, according to this invention, there is provided no central supporting shaft in the agitator so that the above difficulty is not seen. The spiral agitating blade of this invention may be weak in the mechanical strength and therefore it is preferable to reinforce the blade with a plurality of supporting bars extending through the blade in the axial direction.

When only one such spiral or screw-type agitating blade is provided, there is formed so-called "bridge" of the viscous material between the adjacent revoluting portions so that stagnation of the material will occur. According to this invention, a plurality set of such agitating blades are arranged in parallel so as to intermesh but not touch with each other so that the "bridge" which may be formed in one agitating blade is broken by the corresponding revoluting portion on the neighboring agitating blade which moves into the space wherein the above "bridge" is formed. These agitating blades are rotated in opposite directions, In order to further reduce the "bridge," it is preferable to increase the pitch of the spiral agitating blade toward the outlet of the reaction vessel.

The scraping plates are attached at intervals on the spiral blade. Each scraping plate extends radially outwardly from the rotating blade to be very close to the inner wall of the vessel with a very small clearance, for example, 5 mm. or less so as to scrape off the reaction material adhered or deposited on the inner wall.

The reaction material is moved from the feed end to the discharge end of the vessel. This can be achieved, for example, by mounting the agitating blades and/or scraping plates at a proper angle. If desired, this may also be effected by slightly inclining the vessel.

Since the material deposited on the wall of the upper part of the vessel drops or falls due to the gravity, it is not always necessary to positively scrape it off, although such scraping is preferable. Usually it is sufficient that the reaction material on the wall of the lower half of the vessel is scraped by the scraping plates. However, in any case, it is necessary that the width and interval of the scraping plates are such that, upon one complete rotation of the agitating blades, any portion of the wall of the lower half of the vessel is scraped by any one of the scraping plates.

By the above arrangement according to this invention local overheating and local thermal degradation of the material or polymer can be prevented and the mixing of the reaction material in the axial direction is kept minimum so that a homogeneous reaction or polymerization product can be obtained within a short time.

The apparatus of the present invention is particularly useful for conducting the final polycondensation stage in the production of a high viscous polymer such as polyethylene terephthalate or any other copolymerized polyester (e.g., polyethylene isoterephthalate).

The invention will be explained in more detail by referring to the accompanying drawings wherein.

Figure 2:
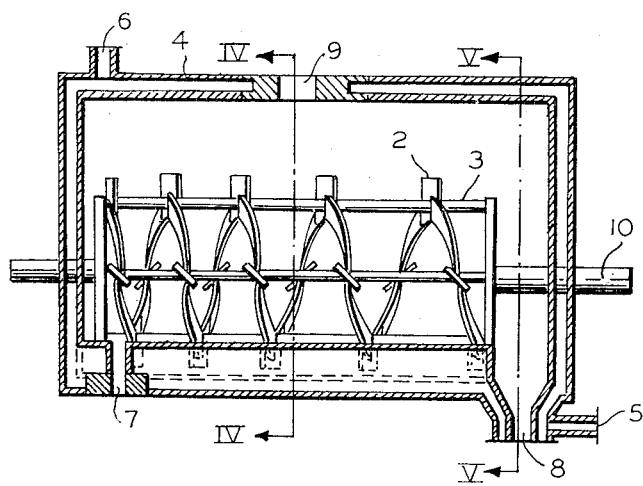
FIG. 2 is a schematic longitudinal section, in side elevation, of an apparatus embodying the invention.
Figure 3:
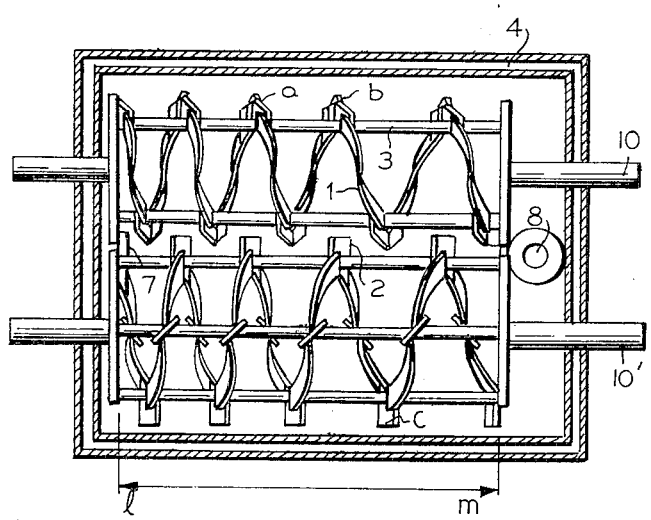
FIG. 3 is a schematic plan view of an apparatus of FIG. 1, with parts omitted and in secton.

Referring to FIGS. 2 and 3, there is shown a horizontally arranged elongated cylindrical reaction vessel fitted with a heating jacket 4 for circulating a heating medium. A suitable heating medium is fed to the jacket 4 from an inlet 5 and discharged from an outlet 6. A reaction material is fed to the vessel from a feeding inlet 7 and moved toward the other end of the vessel and discharged from a discharge outlet 8. During the travel in the vessel the reaction (e.g., polycondensation) proceeds and gaseous byproducts are drawn off through an opening 9. The content (reaction mass) in the vessel is continuously agitated. A reaction (polymerization) apparatus of this type is well known in the art so that no further detailed explanation thereabout will be necessary.

The important and novel feature of this invention is in a particular construction and arrangement of a mechanical agitating means to be explained below.

Figure 1:
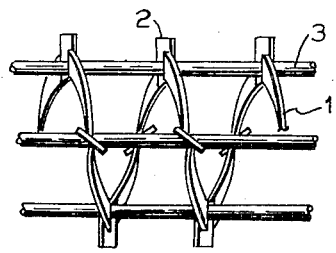
FIG. 1 is a side elevation of a part of a spiral agitating blade embodying the present invention.

According to the invention, there is used an agitating blade 1 which is in the form of spiral or screw as well shown in FIGS. 1 and 2. The blade 1 is made of a strip or band which is twisted to form a continuous screw or spiral blade as a whole. The spiral agitating blade 1 has no central supporting shaft. In order to increase the mechanical strength of the agitating blade it is preferable to provide a plurality of supporting bars. Thus, in the embodiment shown, there are provided four supporting bars 3 horizontally extending in parallel to each other and through the blade 1. The agitating blade 1 is horizontally (the axis of rotation being horizontal) arranged within the vessel as shown. It is preferable that the agitating blade 1 has a coarser pitch (as well shown in FIG. 2) toward the discharge end of the vessel.

Figure 4:
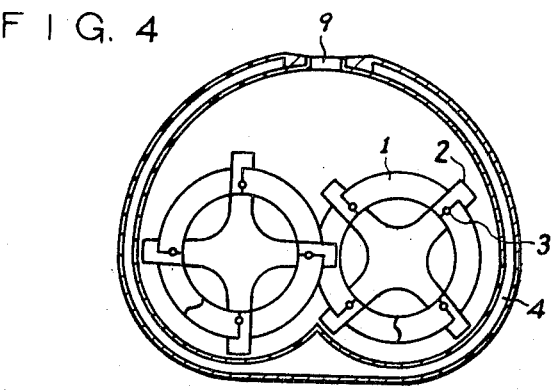
FIG. 4 is a schematic cross section taken on the line IV—IV of FIG. 2.
Figure 5:
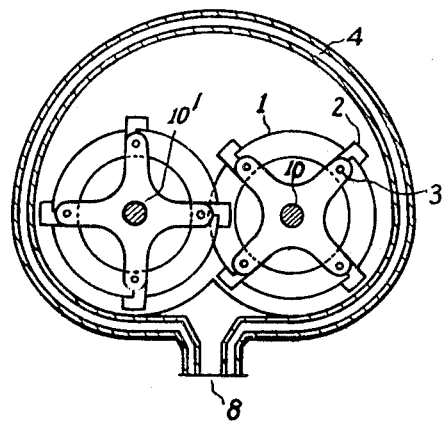
FIG. 5 is a schematic cross section taken on the line V—V of FIG. 2.

On and along the spiral agitating blade 1 there are mounted a series of scraping plates 2 at proper intervals. In the embodiment shown the scraping plates 2 are arranged with 90° interval between the adjacent plates 2 when seen in cross section as shown in FIGS. 4 and 5. Each scraping plate 2 extends radially outwardly from the periphery of the blade 1 to be close to the inner wall (side and bottom wall) of the vessel with a small clearance e.g., about 5 mm. or less therebetween. In the embodiment shown, the scraping plates 2 are mounted at an angle with respect to the axis of rotation of the blade 1. However, it is possible to arrange the scraping plates 2 in parallel to the axial direction of rotation of the blade 1.

As shown in FIGS. 3, 4 and 5, there are provided two sets of such agitating blade 1. These two agitating blades 1 are arranged side by side and in parallel to each other as shown. The arrangement is such that the adjacent blades will intermesh or not touch with each other. These two spiral blades 3 are rotated in opposite directions. Therefore, a "bridge" of the viscous reaction material formed between adjacent revolution sections, e.g., between $a$ and $b$ (FIG. 3) on one agitating blade is broken by a revolution section with the corresponding scraping plate, e.g., $c$ on the other agitating blade because the latter moves into the space between $a$ and $b$.

Further the width, angular position and density (number and interval) are such that when the scraping plates are projected on the wall along the line $l$–$m$ (FIG. 3) they will span or cover substantially all of the line $l$–$m$. Therefore, when the blades with these scraping plates are rotated, substantially all of the inner wall (side and bottom wall) of the lower half of the vessel is subjected to scraping by the scraping plates upon one rotation of the blades.

Each spiral agitating plate with supporting bars thereon is secured at each end with a disc which is connected to a shaft 10 or 10' which extends outwardly through the end wall of the vessel. These shafts 10 and 10' are driven in opposite directions by a driving means (not shown).

As shown, the agitating blades are arranged adjacent the side and bottom walls of the vessel. Usually, in unoperative state, at least one-third of the blades is exposed above the level of the reaction mass in the vessel. Thus, the upper wall of the vessel is not accessible by the blades or scraping blades, but this does not cause noticeable trouble because any viscous mass which is deposited on the upper wall of the vessel would drop or fall by gravity.

The high-viscous material is slowly moved from the inlet end toward the discharge end of the vessel without substantial intermixing in the axial direction. In order to advance the viscous material, the spiral blades 1 and/or scraping plates 2 may be set at a proper angle with respect to the axial direction.

What we claim is:

1. An apparatus for continuously treating a high-viscous material which comprises a vessel within which are substantially horizontally arranged in side-by-side relation at least two spiral agitating blades, each having no central supporting shaft and having a plurality of scraping plates projecting outwardly therefrom to be close to the inner wall of the vessel, the agitating blades, when rotated in opposite directions, intermesh with each other and substantially all of the viscous material on and adjacent the side and bottom wall of the vessel is scraped off by the scraping plates.

2. An apparatus as claimed in claim 1 wherein the pitch of each agitating spiral blade is made coarser toward the discharge end of the vessel.

3. An apparatus as claimed in claim 1 wherein each scraping plate projects radially outwardly from the blade, the clearance between the plate and wall of the vessel being about 5 mm. or less.

4. An apparatus as claimed in claim 1 wherein each blade is reinforced by a plurality of supporting bars extending horizontally through the blade.

5. An apparatus as claimed in claim 1 wherein the scraping plates are set in parallel to the axis of rotation of the blade.

6. An apparatus as claimed in claim 1, wherein the scraping plates are set at an angle to the axis or rotation of the blade.

* * * * *